US012795274B2

(12) United States Patent
Zhang et al.

(10) Patent No.: US 12,795,274 B2
(45) Date of Patent: Nov. 10, 2026

(54) DATA PROCESSING METHOD AND APPARATUS FOR PASSIVE OPTICAL NETWORK SYSTEM, AND PASSIVE OPTICAL NETWORK SYSTEM

(71) Applicant: ZTE Corporation, Shenzhen (CN)

(72) Inventors: Weiliang Zhang, Shenzhen (CN); Liquan Yuan, Shenzhen (CN); Zheng Liu, Shenzhen (CN); Dan Geng, Shenzhen (CN); Yong Guo, Shenzhen (CN); Yongjia Yin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 281 days.

(21) Appl. No.: 18/670,609

(22) Filed: May 21, 2024

(65) Prior Publication Data

US 2024/0314475 A1 Sep. 19, 2024

Related U.S. Application Data

(63) Continuation of application No. 17/837,634, filed on Jun. 10, 2022, now Pat. No. 12,022,249, which is a (Continued)

(30) Foreign Application Priority Data

Sep. 25, 2018 (CN) .......................... 201811115807.4

(51) Int. Cl.
*H04Q 11/00* (2006.01)
*H04L 1/00* (2006.01)

(52) U.S. Cl.
CPC ....... *H04Q 11/0067* (2013.01); *H04L 1/0083* (2013.01); *H04Q 11/0066* (2013.01);
(Continued)

(58) Field of Classification Search
CPC .................................................. H04Q 11/0067
See application file for complete search history.

(56) References Cited

U.S. PATENT DOCUMENTS

| | | | |
|---|---|---|---|
| 9,048,946 | B1 | 6/2015 | Roberts |
| 2009/0049532 | A1 | 2/2009 | Gao et al. |

(Continued)

FOREIGN PATENT DOCUMENTS

| | | | |
|---|---|---|---|
| CN | 101902447 | A | 12/2010 |
| CN | 102104428 | A | 6/2011 |

(Continued)

OTHER PUBLICATIONS

Korean Office Action for corresponding application 10-2024-7021722 dated Aug. 29, 2025.

(Continued)

*Primary Examiner* — Shi K Li
(74) *Attorney, Agent, or Firm* — CANTOR COLBURN LLP

(57) ABSTRACT

Provided are a data processing method and apparatus for a Passive Optical Network (PON) system and a PON system. The method includes: a first partial bandwidth is allocated to a first Optical Network Unit (ONU) within a first time window, the first ONU having completed registration and being in a working state; and a first data frame from the first ONU is received within a time corresponding to the first partial bandwidth, and a second data frame from a second ONU is detected within the first time window, the second ONU having not completed registration.

18 Claims, 5 Drawing Sheets

Related U.S. Application Data continuation of application No. 17/279,718, filed as application No. PCT/CN2019/107508 on Sep. 24, 2019, now Pat. No. 11,388,495.

(52) U.S. Cl.
CPC ................ *H04Q 2011/0064* (2013.01); *H04Q 2011/0081* (2013.01)

(56) References Cited

U.S. PATENT DOCUMENTS

| | | | |
|---|---|---|---|
| 2009/0245792 A1 | 10/2009 | Oishi | |
| 2014/0186025 A1* | 7/2014 | Fang | H04B 10/0795 398/25 |
| 2017/0279527 A1 | 9/2017 | Kim | |
| 2018/0145788 A1 | 5/2018 | Yoshida et al. | |
| 2018/0218692 A1 | 8/2018 | Zeng | |
| 2019/0123846 A1 | 4/2019 | Cress | |

FOREIGN PATENT DOCUMENTS

| | | | |
|---|---|---|---|
| CN | 102223586 | A | 10/2011 |
| CN | 102883234 | A | 1/2013 |
| CN | 103004140 | A | 3/2013 |
| CN | 104469557 | A | 3/2015 |
| CN | 105592078 | A | 5/2016 |
| CN | 107615715 | A | 1/2018 |
| EP | 3537628 | A1 | 9/2019 |
| JP | 2001007832 | A | 1/2001 |
| JP | 2015082784 | A | 4/2015 |
| JP | 2015095756 | A | 5/2015 |
| KR | 20040050337 | A | 6/2004 |
| WO | 2015172294 | A1 | 11/2015 |
| WO | 2016190302 | A1 | 12/2016 |
| WO | 2018094606 | A1 | 5/2018 |
| WO | 2018157291 | A1 | 9/2018 |

OTHER PUBLICATIONS

Chinese Office Action for corresponding application 2022105774978; Report dated Jan. 17, 2025.

Japanese Office Action for corresponding Patent Application No. 2024-063796; Dated Jan. 30, 2025.

European Search Report for corresponding application EP19866708; Report dated Nov. 12, 2021.

International Search Report for corresponding application PCT/CN2019/107508 filed Sep. 24, 2019; Mail date Dec. 4, 2019.

* cited by examiner

DATA PROCESSING METHOD AND APPARATUS FOR PASSIVE OPTICAL NETWORK SYSTEM, AND PASSIVE OPTICAL NETWORK SYSTEM

CROSS-REFERENCE TO RELATED APPLICATIONS

This application is a continuation of U.S. application Ser. No. 17/837,634, filed on Jun. 8, 2022, the entirety of which is herein incorporated by reference.

TECHNICAL FIELD

The present disclosure relates to the field of Passive Optical Networks (PONs), and more particularly to a data processing method and apparatus for a PON system, and a PON system.

BACKGROUND

A PON architecture is a point-to-multipoint network architecture. A PON consist of an Optical Line Terminal (OLT), an Optical Distribute Network (ODN) and Optical Network Units (ONUs). FIG. 1 is a schematic diagram of a PON architecture according to the related art. As shown in FIG. 1, an OLT may be connected to multiple ONUs through an ODN. The distances between the ONUs and the OLT are different. A PON system can define a maximum distance between ONUs and an OLT and a maximum distance difference between each ONU and the OLT.

In the PON system, the ONU usually needs to complete a registration process together with the OLT, which may include, but is not limited to: the OLT acquires information of the ONU, and the OLT test a logical distance with the ONU. In the registration process of the ONU, since the OLT cannot know the logical distance with the ONU in advance, it cannot determine when a registration information frame sent by the ONU can reach the OLT. The registration information frame sent by the ONU reaches the OLT within a time window. A starting time of the time window is an earliest time when an ONU nearest to the OLT sends the registration information frame to reach the OLT, and an ending time is a latest time when an ONU farthest from the OLT sends the registration information frame to reach the OLT. Within the time window, if the normally working ONU which has completed registration sends an uplink data frame, the uplink data frame may collision with the registration information frame sent by the ONU which is being registered, so that the uplink data frame sent by the normally working ONU is damaged and cannot be correctly parsed by the OLT, and transmission data is lost. Therefore, in the existing PON system, within the time window, the normally working ONU does not send the uplink data frame so as to avoid collision with the registration information frame sent by the Registering ONU. FIG. 2 is a schematic diagram of a quiet window used in a PON system according to the related art. As shown in FIG. 2, in the existing PON system, there are an OLT, an ONU nearest to the OLT, a normally working ONU, a Registering ONU, and an ONU farthest from the OLT, respectively. The time window in which the above normally working ONU sends the uplink data frame may collision with the registration information frame sent by the ONU which is being registered is generally referred to as a silent window or quiet window.

In the existing PON system, on the one hand, if the maximum distance difference between the OLT and the ONU is 20 km, the quiet window is at least 200 microseconds. If the maximum distance difference between the OLT and the ONU is 10 km, the quiet window is at least 100 microseconds. On the other hand, the existing PON system allows multiple ONUs to register within the same quiet window, thereby easily causing collision possibility of registration information frames sent by the multiple ONUs. If the registration information frames sent by the multiple ONUs collision, the OLT cannot parse the registration information frames, thereby easily causing the ONUs to need to resend registration information frames for registration, and therefore the registration completion time of the ONUs may be delayed. In combination with the above analysis, the registration completion time of the PON system will be delayed, and as the number of ONUs needing to be registered is increasing, the registration completion time of the PON system will be longer. In order to achieve rapid registration of the ONUs and improve user experience, the OLT usually needs to periodically open a quiet window, so that the ONUs have more registration opportunities.

In addition, in the existing PON system, the open quiet window in the ONU registration process brings delay to the data sending of the normally working ONU. If the working ONU has uplink data to send just at the beginning of the quiet window, it needs to wait for the end of the quiet window before there is an opportunity to send the uplink data. It can be seen therefrom that the delay caused by the uplink data of the normally working ONU is at least the size of the quiet window, and since the quiet window is usually periodically opened, the ONU registration process brings frequent delay to the data sending of the normally working ONU.

With the development of mobile services, the PON system has gradually become one of the bearer technologies of mobile services, and mobile services put forward more strict requirements on the transmission delay of a bearer network. For example, the transmission delay requirement currently proposed by the industry for bearing the fifth-generation mobile communication technology (5G) forward service by the PON system is controlled within 100 microseconds. However, from the foregoing analysis, when the maximum distance difference between the OLT and the ONUs in the PON is 10 km, the quiet window in the ONU registration process has brought a delay of at least 100 microseconds to the data sending of the normally working ONU. In the PON system, besides the delay caused by the quiet window for optical network data transmission, the data transmission delay caused by optical fiber transmission, dynamic bandwidth allocation and the like is also caused. Therefore, it is difficult for the existing PON system to meet the transmission delay requirements required for mobile services.

SUMMARY

At least some embodiments of the present disclosure provide a data processing method and apparatus for a PON system, and a PON system, which are intended to at least solve the problem that low delay requirements of bearer mobile services cannot be met due to transmission delay of a PON system caused by a quiet window in an ONU registration process of the PON system provided in the related art is solved.

According to an embodiment of the present disclosure, a data processing method for a PON system is provided, which may include that: a first partial bandwidth is allocated to a first ONU within a first time window, the first ONU having completed registration and being in a working state;

and a first data frame from the first ONU is received within a time corresponding to the first partial bandwidth, and a second data frame from a second ONU is detected within the first time window, the second ONU having not completed registration.

According to another embodiment of the present disclosure, another data processing method for a PON system is also provided, which may include that: a first partial bandwidth allocated by an OLT is acquired; and a first data frame is sent to the OLT within the first partial bandwidth, and a second data frame is sent to the OLT when preset conditions are met, the first data frame being a service data frame sent by an ONU that has completed registration and is in a working state, and the second data frame being a registration signal frame sent by an ONU that has not completed registration.

According to yet another embodiment of the present disclosure, a data processing apparatus for a PON system is provided, which may include: an allocation module, configured to allocate a first partial bandwidth to a first ONU within a first time window, the first ONU having completed registration and being in a working state; and a processing module, configured to receive a first data frame from the first ONU within a time corresponding to the first partial bandwidth, and detect a second data frame from a second ONU within the first time window, the second ONU having not completed registration.

According to yet another embodiment of the present disclosure, another data processing apparatus for a PON system is also provided, which may include: an acquisition module, configured to acquire a first partial bandwidth allocated by an OLT; and a processing module, configured to send a first data frame to the OLT within the first partial bandwidth, and send a second data frame to the OLT when preset conditions are met, the first data frame being a service data frame sent by an ONU that has completed registration and is in a working state, and the second data frame being a registration signal frame sent by an ONU that has not completed registration.

According to yet another embodiment of the present disclosure, a PON system is also provided, which may include: an OLT and multiple ONUs. The OLT may include: the above data processing apparatus for a PON system. At least one of the multiple ONUs may include: the another data processing apparatus for a PON system.

According to yet another embodiment of the present disclosure, a storage medium is also provided. The storage medium may store a computer program that is configured to, when run, perform the steps in any one of the above method embodiments.

According to yet another embodiment of the present application, an electronic device is also provided. The electronic device may include a memory and a processor. The memory may store a computer program. The processor may be configured to run the computer program to perform the steps in any one of the above method embodiments.

Through at least some embodiments of the present disclosure, since the first ONU may send a data frame in the registration process of the second ONU, that is, when the second ONU exists for registration, the first ONU may send data so as to fully utilize the bandwidth in the first time window. Therefore, the problem that low delay requirements of bearer mobile services cannot be met due to transmission delay of a PON system caused by a quiet window in an ONU registration process of the PON system provided in the related art can be solved, and the effects of reducing the transmission delay of the PON system and meeting the low delay requirements of the bearer mobile services can be achieved.

BRIEF DESCRIPTION OF THE DRAWINGS

The accompanying drawings described herein are used to provide a further understanding of the present disclosure, and constitute a part of the present application, and the exemplary embodiments of the present disclosure and the description thereof are used to explain the present disclosure, but do not constitute limitations to the present disclosure. In the drawings.

DETAILED DESCRIPTION OF THE EMBODIMENTS

Figure 1:
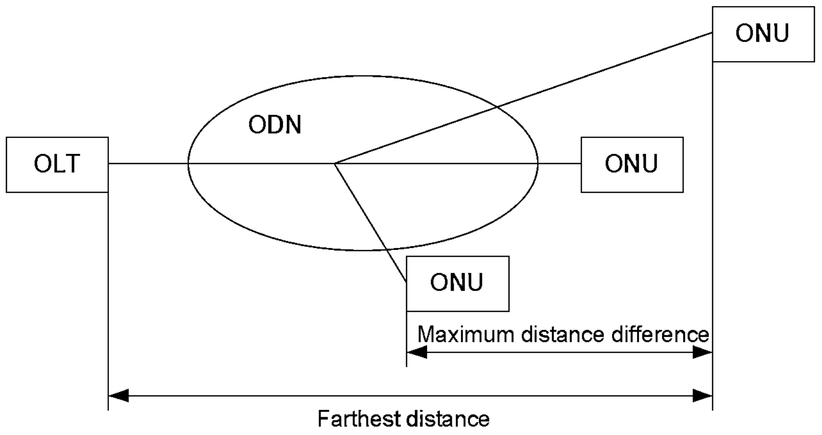
FIG. 1 is a schematic diagram of a PON architecture according to the related art.
Figure 2:
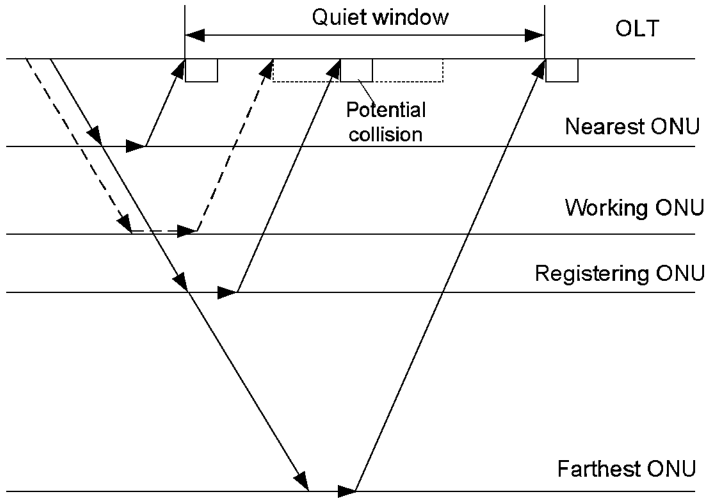
FIG. 2 is a schematic diagram of a quiet window used in a PON system according to the related art.

The present disclosure will be described in detail below with reference to the drawings in conjunction with the embodiments. It is to be noted that embodiments in the present application and characteristics in the embodiments may be combined under the condition of no collisions.

It is to be noted that the specification and claims of the present disclosure and the terms "first", "second" and the like in the drawings are used to distinguish similar objects, and do not need to describe a specific sequence or a precedence order.

Embodiment One

The method embodiment provided in Embodiment 1 of the present application may be executed in an OLT or an ONU. The OLT or the ONU may include one or more processors (the processor may include but is not limited to a processing apparatus such as a Micro Controller Unit (MCU) or a Field Programmable Gate Array (FPGA) and a memory for storing data. In an embodiment, the OLT or the ONU may further include a transmission component for communication functions and an input output component. Of course, it will be understood by those skilled in the art that the structural description is merely illustrative and does not limit the structure of the OLT or the ONU. For example, the OLT or the ONU may also include more or fewer components than the above structure, or may have a different configuration from the above structure.

The memory may be configured to store a computer program, for example, a software program of application software and a module, such as a computer program corresponding to a data processing method for a PON system in the embodiment of the present disclosure. The processor executes various functional applications and data processing by running the computer program stored in the memory, that is, the data processing method for a PON system is implemented. The memory may include a high speed random access memory and may also include a non-volatile memory such as one or more magnetic storage apparatuses, a flash memory, or other non-volatile solid state memories. In some examples, the memory may further include memories remotely located relative to the processor, which may be connected to the OLT or the ONU over a network. The examples of such networks include, but are not limited to, the Internet, the Intranet, local area networks, mobile communication networks, and combinations thereof.

The transmission component is configured to receive or send data via a network. The above specific network examples may include a wireless network provided by a communication provider of the OLT or the ONU. In one example, the transmission component includes a Network Interface Controller (NIC) for communicating with the Internet wirelessly. In another example, the transmission component may be a Radio Frequency (RF) module for communicating with the Internet wirelessly.

Figure 3:
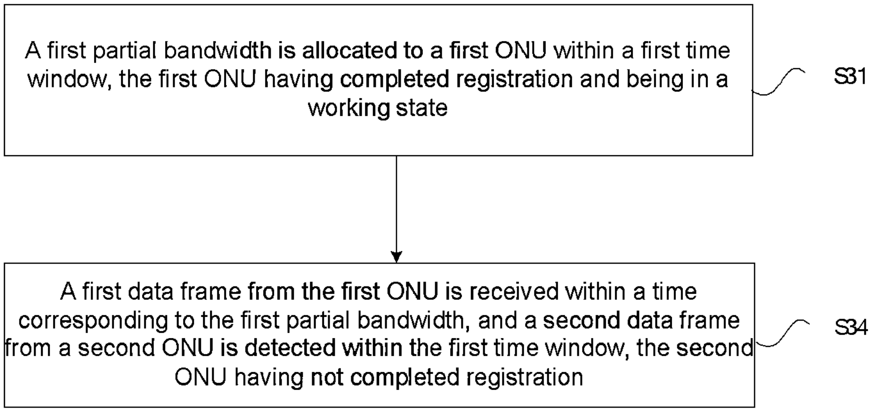
FIG. 3 is a flowchart of a data processing method for a PON system according to an embodiment of the present disclosure.

A data processing method for a PON system running on an OLT is provided in the present embodiment. FIG. 3 is a flowchart of a data processing method for a PON system according to an embodiment of the present disclosure. As shown in FIG. 3, the flow includes the following steps.

In step S31, a first partial bandwidth is allocated to a first ONU within a first time window, the first ONU having completed registration and being in a working state. In order to solve the delay problem caused by a quiet window in an ONU registration process in a PON system, the embodiment of the present disclosure provides a PON system and an ONU registration mechanism so as to reduce the transmission delay of the PON system. It is to be noted that the present disclosure does not restrict a working ONU (equivalent to the above first ONU) from sending data within the quiet window, and therefore the embodiment of the present disclosure uses a noisy window (equivalent to the above first time window) to replace the quiet window. A starting time of the noisy window is consistent with a starting time of the quiet window, and an ending time of the noisy window is consistent with an ending time of the quiet window. That is, the starting time of the first time window is an earliest time when a data frame sent by an ONU nearest to the OLT reaches the OLT, and the ending time of the first time window is a latest time when a data frame sent by an ONU farthest from the OLT reaches the OLT. The working ONU may send data within the noisy window.

In step S34, a first data frame from the first ONU is received within a time corresponding to the first partial bandwidth, and a second data frame from a second ONU is detected within the first time window, the second ONU having not completed registration. With regard to a registration signal (equivalent to the above second data frame) sent by a Registering ONU (equivalent to the above second ONU), the OLT detects the registration signal in an idle bandwidth or a data bandwidth.

When an ONU or a potential ONU is registered, the Registering ONU sends a registration signal to reach the OLT within a noisy window. The OLT allocates a partial bandwidth in the noisy window to the working ONU for sending uplink data, the partial bandwidth being a data bandwidth. A partial bandwidth is not allocated, which is an idle bandwidth. The working ONU sends uplink data within the allocated bandwidth obtained in the noisy window, and the Registering ONU sends a registration signal in the noisy window. The OLT detects the registration signal within the noisy window.

In an embodiment, the execution body of the above steps may be, but is not limited to, an OLT or the like. In an optional implementation manner, the first time window may be all times, the first ONU may send a first data frame, and the second ONU may send a second data frame at any time.

In an optional implementation manner, the second data frame sent by the second ONU needs to reach the OLT within a second partial bandwidth except the first partial bandwidth within the first time window. That is, the first data frame sent by the first ONU and the second data frame sent by the second ONU reach the OLT within different bandwidths within the first time window, respectively.

In addition, in the PON system formed by the OLT and the multiple ONUs, data sent by different ONUs are allowed to collision at the OLT side, and the OLT can recover the data sent by at least one ONU.

Through the above steps, since the first ONU may send a data frame in the registration process of the second ONU, that is, when the second ONU exists for registration, the first ONU may send data so as to fully utilize the bandwidth in the first time window. Therefore, the problem that low delay requirements of bearer mobile services cannot be met due to transmission delay of a PON system caused by a quiet window in an ONU registration process of the PON system provided in the related art can be solved, and the effects of reducing the transmission delay of the PON system and meeting the low delay requirements of the bearer mobile services can be achieved.

Since the registration signal sent by the Registering ONU may collision with a working data frame sent by the working ONU, in a place where the registration signal collisions with the working data frame, i.e. a collision position, the registration signal may damage the working data frame to a certain extent, and the working data frame may generate a corresponding error. Therefore, in order to reduce the damage range of the registration signal to the working data frame when the collision occurs, the registration signal should be as short as possible. The registration signal sent by the Registering ONU is a burst signal, which may generally include: an optical module ON light-emitting part, a registration information part, and an optical module OFF light-emitting part. The optical module ON light-emitting part and the optical module OFF light-emitting part are defined in a PON standard. For example, it is specified in the International Telecommunication Union Telecommunication Standardization Organization (ITU-T) Gigabit Passive Optical Network (GPON) standard that both the optical module ON light-emitting part and the optical module OFF light-emitting part of the ONU are 12.8 nanoseconds/4 bytes. It is specified in the ITU-T 10-Gigabit-capable Symmetric Passive Optical Network (XGS-PON) that both the optical module ON light-emitting part and the optical module OFF light-emitting part of the ONU are 25.7 nanoseconds/32 bytes. In addition, the optical module ON light-emitting part and the optical module OFF light-emitting part are also relevant to a specific implementation of an optical module, which may be better or shorter than the standard. For example, the optical module ON light-emitting part and the optical module OFF light-emitting part may reach 5-10 nanoseconds, for a total sum of about 4-7 bytes in the GPON and about 13-25 bytes in the XGS-PON. As long as the registration information part can be detected by the OLT, for example, a registration signal at a rate of 10 Gbps and having a length of 3 bytes can be detected by the optical module of the OLT. If the OLT is not required to correctly parse registration information, the registration information part may not contain preambles, delimitations, etc. Of course, if the registration information part contains contents such as preambles and delimitations, the OLT can correctly parse the registration information, and the OLT can recover a working data frame damaged by the collision of the registration signal. In summary, under current standards and realizable conditions, taking the XGS-PON as an example, the registration signal of the ONU is 67 bytes in maximum and 16 bytes in minimum. It is to be noted that the registration signal sent by the ONU and the related optical module ON light-emitting part, the optical module OFF light-emitting part, the registration information part for optical module detection, the relevant standard definition and the specific implementation in the embodiment of the present disclosure are only used for describing the completeness of the solution of the present disclosure and do not constitute a limitation on the present disclosure, and the relevant standard definition and the possible variations of the specific implementation fall within the scope of the present disclosure as long as they are applicable to the present disclosure.

In an embodiment, before the first data frame from the first ONU is received within the first partial bandwidth and the second data frame from the second ONU is detected within the first time window in step S34, the method may further include the following execution steps.

In step S33, a registration request message is sent to the second ONU, the registration request message being used for notifying the second ONU to send the second data frame, and the registration request message at least carrying first authentication information.

The OLT side acquires ONU authentication information or an authentication information library under the OLT. The ONU authentication information (that is, the above first authentication information) may include, but is not limited to: a serial number of an ONU, a Media Access Control (MAC) address of an ONU, and registration information (that is, registration ID) of an ONU user. The OLT marks an ONU that completes registration and an ONU that does not complete registration, respectively. The operation that the OLT initiates registration of the ONU that does not complete registration may include that: the OLT sends authentication information and a registration command (equivalent to the above registration request message) of the ONU to the Registering ONU so as to notify the ONU to send a registration signal. The registration signal may be designated by the OLT or may be determined by the ONU independently. Meanwhile, the OLT allocates a partial bandwidth in the noisy window to the working ONU, and a partial bandwidth is not allocated.

In an embodiment, before the registration request message is sent to the second ONU in step S33, the method may further include the following execution steps.

In step S32, authentication information of the first ONU and the second ONU is stored so as to initiate a registration process to the second ONU according to the authentication information, the authentication information including: identity information of each ONU and/or identity information of an ONU user.

In the ONU registration process, the OLT authenticates the ONU. Only after authentication, the ONU can access the OLT. The information for authenticating the ONU by the OLT includes: identity information of the ONU and identity information of the ONU user. The authentication information of the ONU accessing the OLT forms an ONU authentication information library. The ONU authentication information library may be stored in the OLT or in a higher-level system (for example, a PON management system).

The OLT may initiate a registration process for the ONU corresponding to one or more of authentication information according to the ONU authentication information library so as to control the number of Registering ONUs in one noisy window, thereby reducing the probability of collision between the registration information and reducing the damage range for sending data to a working optical network.

In an embodiment, the registration request message further carries a delay duration for instructing the second ONU to send the second data frame after waiting for the delay duration.

After the Registering ONU is powered on, it waits for the OLT to start the registration process. If a registration command belonging to the ONU is received, the ONU sends a registration signal to the OLT immediately under the condition that the registration command does not carry the delay duration, or sends a registration signal to the OLT after waiting for the delay duration specified by the OLT under the condition that the registration command carries the delay duration.

Figure 4:
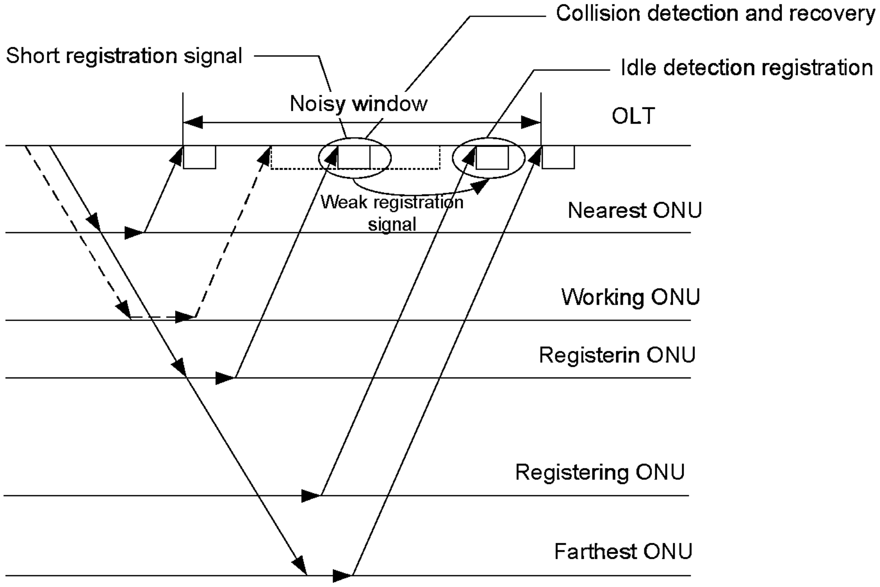
FIG. 4 is a schematic diagram of a process in which a working ONU sends uplink data and a Registering ONU sends a registration signal according to an embodiment of the present disclosure.

FIG. 4 is a schematic diagram of a process in which a working ONU sends uplink data and a Registering ONU sends a registration signal according to an embodiment of the present disclosure. As shown in FIG. 4, an OLT detects a registration signal in a noisy window, which may include: the OLT detects a registration signal in an idle bandwidth of the noisy window, calculates a ranging result, or opens a small quiet window for accurate ranging to the ONU. The OLT detects an error in a data frame sent by the working ONU, recovers data sent by the working ONU, predicts that a position where the error occurs is caused by a registration signal sent by the Registering ONU, and roughly positions a logical distance of the ONU so as to accurately range a small quiet window opened by the ONU. The OLT detects a partial registration signal in an idle bandwidth of the noisy window, detects an error in data sent by the working ONU, recovers the data sent by the working ONU, and then roughly positions a logical distance of the ONU in combination with the two pieces of information, so as to accurately range a small quiet window opened by the ONU. The OLT does not detect any registration information in the noisy window and marks the ONU, the ONU may not start registration, or the registration signal sent by the ONU is weak and data sent by the working ONU is not affected, and the OLT initiates the registration process to the ONU again after adjusting the bandwidth allocation in the noisy window.

The OLT roughly estimates a logical distance between the Registering ONU and the OLT according to the registration signal sent by the Registering ONU detected in the noisy window, and opens a small quiet window, so that the Registering ONU sends registration information, the OLT confirms the identity of the ONU and calculates a ranging result, and the registration process is completed.

For an ONU which has not detected registration information in the noisy window, registration may be performed again, and registration may also be performed after registration of other ONUs is completed. If the registration signal sent by the Registering ONU is judged to be weak, measures which may be taken by the OLT include: the OLT adjusts the positions of the idle bandwidth and the working bandwidth in the noisy window so that there is a new opportunity to detect the registration signal within the idle bandwidth. The OLT generates a random delay and notifies the Registering ONU to send the registration signal after the delay so that the OLT has a new opportunity to detect the registration signal within the idle bandwidth. If it is judged that the Registering ONU does not start registration, the OLT may change a registration strategy. For example, after waiting for a longer time, registration on the ONU is initiated to reduce the influence on the working ONU.

In an embodiment, the operation that the first data frame from the first ONU is received within the time corresponding to the first partial bandwidth in step S34 may include the following execution steps.

In step S341, the first data frame is obtained by utilizing redundancy protection measures taken by the first ONU on the first data frame.

In order to ensure that when data sent by different ONUs collision at the OLT side, the OLT can recover the data sent by at least one of the ONUs, the working ONU needs to take redundancy protection measures on a data frame sent by the working ONU, so that the OLT can recover the data sent by the working ONU according to the redundancy protection measures.

In an embodiment, the operation that the first data frame from the first ONU is received within the time corresponding to the first partial bandwidth in step S34 may further include the following execution steps.

In step S342, when the redundancy protection measures taken by the first ONU on the first data frame are utilized to identify that the first data frame is in error, a collision position of the second data frame and the first data frame is obtained.

In addition to recovering the data sent by the working ONU as far as possible, the OLT can preliminarily position an actual position where the collision occurs between the working ONU and the Registering ONU when determining that the data frame sent by the working ONU is in error through the redundancy protection measures.

In an embodiment, after the collision position of the second data frame and the first data frame is obtained in step S342, the method may further include the following execution steps.

In step S343, the first partial bandwidth is allocated within the subsequent first time window, the collision position being not contained in the time corresponding to the first partial bandwidth; and the second data frame from the second ONU is detected within the first time window, and the collision position is positioned again.

That is, when the OLT allocates a partial bandwidth to the working ONU within the subsequent time window, the bandwidth may not be allocated at the collision position, so that the collision position may be further positioned/confirmed by repeatedly comparing with the collision position determined previously through subsequent repeated detection.

In an embodiment, the operation that the first partial bandwidth is allocated to the first ONU within the first time window in step S31 may further include the following execution steps.

In step S30, the first ONU is notified to take redundancy protection measures on the first data frame.

If needed, when the OLT allocates the bandwidth in the noisy window for the working ONU, the working ONU is notified to perform redundancy protection when sending data. The working ONU receives the bandwidth in the noisy window allocated by the OLT, and the working ONU needs to perform redundancy protection on data when sending the data in the bandwidth.

In an optional implementation manner, a third partial bandwidth may be allocated to the first ONU in addition to allocating the first partial bandwidth to the first ONU within the first time window. The third partial bandwidth is used for the first ONU to repeatedly send the first data frame.

In addition to allocating a normal bandwidth to the working ONU, the OLT also allocates an additional bandwidth (equivalent to the above third partial bandwidth) in the noisy window, so that the working ONU sends data within the normal bandwidth, and repeatedly sends the data sent within the normal bandwidth within the additional bandwidth.

After receiving a normal bandwidth and a redundant bandwidth in the noisy window allocated by the OLT, the working ONU sends data within the normal bandwidth and repeatedly sends the data sent within the normal bandwidth within the redundant bandwidth. The data is sent within the normal bandwidth through the working ONU, and the data sent within the normal bandwidth is repeatedly sent within the additional bandwidth. Therefore, even if one part of the data is damaged by collision, the other part of the data is not damaged by collision, so that the OLT can recover uplink data from the data which is not damaged by collision. This redundancy protection measure may be used when there are more idle bandwidths in the noisy window.

In an embodiment, the operation that the collision position of the second data frame and the first data frame is obtained when the redundancy protection measures taken by the first ONU on the first data frame are utilized to identify that the first data frame is in error in step S342 may include the following execution steps.

In step S3421, when detecting that the first data frame is in error through a preset coding mode adopted by the first ONU for a payload of the first data frame, the first data frame is recovered and the collision position is positioned, a damage range of a collision between the second data frame and the first data frame being within an error correction range of a coding redundancy protection block of the preset coding mode.

The working ONU sends data within the allocated bandwidth obtained in the noisy window, and adopts Forward Error Correction (FEC) and other codes to perform redundancy protection. The damage range of the registration signal is within the error correction range of the coding redundancy protection block, the OLT can recover the data damaged by collision and can position a bit where the error occurs. For example, when the FEC employs Reed-Solomon RS (255, 223), the error correction capability of an FEC block is (255−223)/2=16 bytes. Thus, when the registration signal damage capability does not exceed 16 bytes, the ONU may take such redundancy protection measures.

The working ONU sends data within the allocated bandwidth obtained in the noisy window, adopts FEC and other codes to perform redundancy protection, adopts random interleaving of coding blocks, and disperses concentrated errors generated by collision into multiple coding blocks. In the receiving process, the OLT firstly performs de-interleaving of interleaved coding blocks, recovers each coding block, respectively performs check and error correction on each coding block, and then performs interleaving of the coding blocks so as to judge a position where the error occurs. Taking RS (255, 223) as an example, each FEC block is 255 bytes, and the interleaving order of two FEC blocks is as follows: a first bit of the first FEC block, a second bit of the second FEC block, a second bit of the first FEC block, a second bit of the second FEC block, . . . a 255th bit of the first FEC block, and a 255th bit of the second FEC block, and a 510-byte FEC interleaved block is formed. When the damage range of the registration signal to the FEC interleaved block is 16 bytes, the damage is dispersed into two FEC blocks in the FEC interleaved block, and 8 bytes of each FEC block are damaged. Of course, interleaving of more FEC blocks may be achieved, and the interleaving process may be in units of 1 bit or in units of multiple bits. The descriptions are omitted herein.

In an embodiment, the operation that the collision position of the second data frame and the first data frame is obtained when the redundancy protection measures taken by the first ONU on the first data frame are utilized to identify that the first data frame is in error in step S342 may include the following execution steps.

In step S3422, when detecting the abnormality of signal amplitude and/or a signal clock by performing signal amplitude detection and signal clock recovery on a preamble lengthened by the first ONU, the signal amplitude and/or the signal clock are recovered, and the collision position is positioned.

Figure 5:
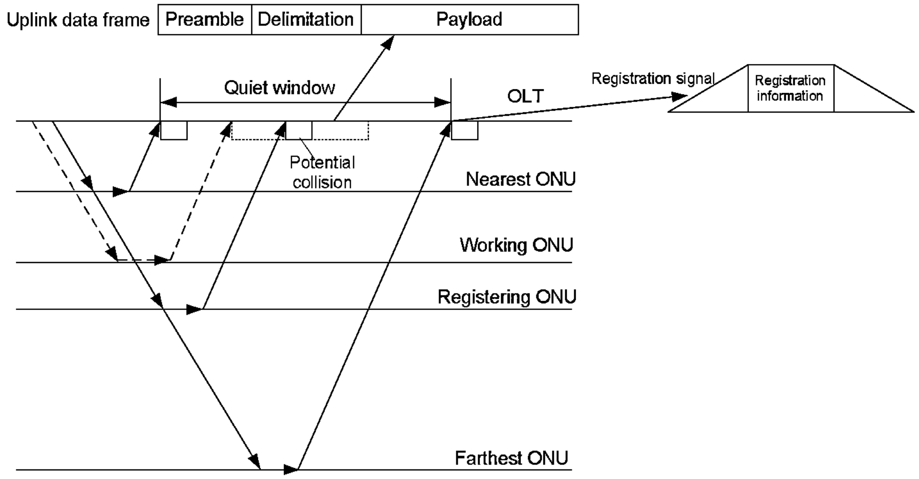
FIG. 5 is a schematic diagram of an uplink data frame and a registration signal according to an embodiment of the present disclosure.

The data sent by the working ONU is a burst data frame, and the data frame further follows fields such as a preamble and delimitation. FIG. 5 is a schematic diagram of an uplink data frame and a registration signal according to an embodiment of the present disclosure. As shown in FIG. 5, the preamble is mainly used for signal amplitude detection and signal clock recovery at an OLT and is usually obtained by repeating a fixed bit sequence. The delimitation is used for the OLT to identify a starting position of the burst data frame and is usually a fixed bit sequence. If the preamble and the delimitation are damaged, the OLT may not be able to correctly parse an uplink data frame sent by the working ONU, and therefore redundancy protection is also needed for the preamble and the delimitation, including preamble lengthening, delimitation lengthening and changing, etc. As an optional implementation manner, the preamble is lengthened to twice the original preamble plus the length of a registration signal, the registration signal occurring at any position of the lengthened preamble. The OLT can finish signal amplitude detection and signal clock recovery in the lengthened preamble, and the OLT can roughly judge the collision position of the register signal by combining information such as a time point when an uplink data frame signal is detected, a time point when the signal clock recovery is completed, and information that the position of the delimitation is obtained. As an optional implementation manner, the OLT performs multiple signal amplitude detections at the front of the lengthened preamble and selects signal amplitude with a higher confidence level for subsequent signals. As an optional implementation manner, the OLT locks the signal amplitude for a longer period of time after the lengthened preamble completes the signal amplitude detection. In an embodiment, the operation that the collision position of the second data frame and the first data frame is obtained when the redundancy protection measures taken by the first ONU on the first data frame are utilized to identify that the first data frame is in error in step S342 may include the following execution steps.

In step S3423, when an error is detected from a delimitation lengthening changed by the first ONU, at least one part of the delimitation is correctly identified, a position where the delimitation is in error is obtained, the collision position is positioned, and a starting position of a payload is obtained. The working ONU may lengthen and change the original delimitation, no matter where the collision between the registration signal and the lengthening changed delimitation occurs, the OLT can find at least a correct part of the lengthening changed delimitation, the collision position of the registration signal can be roughly judged according to the correct part, and the starting position of the payload can be obtained.

The following will be described in connection with one of the following optional embodiments in a number of different cases from the point of view of a registration signal collision with a working data frame and causing damage:

Case 1: A registration signal sent by the registering ONU collisions with an uplink data frame sent by the working ONU, and causes an error for a payload in the uplink data frame sent by the working ONU.

To simplify the description, in this optional embodiment, the ONU authentication information library is stored in the OLT. The OLT initiates a registration process for the ONUs corresponding to the authentication information in the ONU authentication information library one by one, and initiates a registration process for one of the ONUs which does not complete registration each time. The OLT sends a registration request to the Registering ONU. The registration request contains authentication information of the Registering ONU, for example, a serial number of the Registering ONU or a registration sequence of the ONU user. In addition, the registration request may also contain a delay time required before the Registering ONU sends the registration information. The OLT allocates a partial uplink bandwidth in the noisy window to the working ONU to meet a bandwidth requirement of the working ONU.

After receiving the registration request sent by the OLT, the Registering ONU analyzes the ONU authentication information and the delay time (if the registration request contains the information) therein so as to judge whether the authentication information of the Registering ONU is consistent with the ONU authentication information in the registration request. If so, a registration signal is sent to the OLT in response to the registration request either directly or after waiting for a specified delay time.

After obtaining the allocated bandwidth in the noisy window, the working ONU constructs an uplink data frame matched with the size of the allocated bandwidth. The length of a preamble of the uplink data frame is twice that of a preamble of a normal data frame plus the length of a registration signal, and a delimitation of the uplink data frame is lengthening changed from a normal delimitation. The delimitation length is at least one original delimitation length larger than that of the registration signal. FEC check is added to a payload after the uplink data frame is delimited, FEC block interleaving is performed to form a final uplink data frame, and then the uplink data frame is sent within the allocated bandwidth in the noisy window. The OLT receives the uplink data frame sent by the working ONU in the noisy window, processes the preamble to obtain a signal amplitude and a recovered signal clock, continues to receive a subsequent data stream, identifies the lengthening changed delimitation to obtain an uplink data frame payload, reduces an interleaved FEC block in the uplink data frame payload into an independent FEC block, and performs check and error correction on the independent FEC block to obtain correct FEC data. If errors are detected and positioned in multiple independent FEC blocks, the errors in the multiple independent FEC blocks are correlated according to FEC interleaving, the positions where the errors occur in the uplink data frame sent by the working ONU are positioned, and a Round Trip Time (RTT) of the Registering ONU is estimated according to the positions where the errors occur and the delay time (if any) when the Registering ONU sends the registration information. The OLT opens an accurate quiet window for the Registering ONU in a subsequent bandwidth allocation process according to the estimated RTT of the Registering ONU. The Registering ONU may send own authentication information in the quiet window, the OLT may obtain the authentication information of the Registering ONU in the quiet window and perform ranging on the ONU, and the ONU is matched with the OLT to further complete the registration process. Here, the quiet window may be either an unallocated idle bandwidth or an idle bandwidth obtained by the OLT through an overall bandwidth allocation algorithm.

The OLT may register other ONUs which do not complete registration as required.

Case 2: In this optional embodiment, a registration signal sent by the registering ONU collisions with an uplink data frame sent by the working ONU, and causes an error for a preamble in the uplink data frame sent by the working ONU.

To simplify the description, in this optional embodiment, the ONU authentication information library is stored in the OLT. The OLT initiates a registration process for the ONUs corresponding to the authentication information in the ONU authentication information library one by one, and initiates a registration process for one of the ONUs which does not complete registration each time.

The OLT sends a registration request to the Registering ONU. The registration request contains authentication information of the Registering ONU, for example, a serial number of the Registering ONU or a registration sequence of the ONU user. In addition, the registration request may also contain a delay time required before the Registering ONU sends the registration information. The OLT allocates a partial uplink bandwidth in the noisy window to the working ONU to meet a bandwidth requirement of the working ONU.

After receiving the registration request sent by the OLT, the Registering ONU analyzes the ONU authentication information and the delay time (if the registration request contains the information) therein so as to judge whether the authentication information of the Registering ONU is consistent with the ONU authentication information in the registration request. If so, a registration signal is sent to the OLT in response to the registration request either directly or after waiting for a specified delay time.

The working ONU obtains the allocated bandwidth in the noisy window, and constructs an uplink data frame matched with the size of the allocated bandwidth. The length of a preamble of the uplink data frame is twice that of a preamble of a normal data frame plus the length of a registration signal, and a delimitation of the uplink data frame is lengthening changed from a normal delimitation. The delimitation length is at least one original delimitation length larger than that of the registration signal. FEC check is added to a payload after the uplink data frame is delimited, FEC block interleaving is performed to form a final uplink data frame, and then the uplink data frame is sent within the allocated bandwidth in the noisy window.

When the OLT receives the uplink data frame sent by the working ONU in the noisy window and processes the preamble, the following information is obtained: a position where an uplink data frame signal is detected, a position where signal amplitude detection is completed, a position where a signal clock is recovered, a repeated delimitation position, a payload starting point and the like. The difference between the positions is calculated. If one or more of the position differences are larger than a normal position difference, a collision position of the registration signal may be roughly estimated, an RTT of the Registering ONU is estimated according to a delay time (if any) when the Registering ONU sends the registration information. a subsequent data stream is continuously received, an uplink data frame payload is obtained after a repeated delimitation is identified, an interleaved FEC block in the uplink data frame payload is reduced into an independent FEC block, and check and error correction are performed on the independent FEC block to obtain correct FEC data. The OLT opens an accurate quiet window for the Registering ONU in a subsequent bandwidth allocation process according to the estimated RTT of the Registering ONU. The Registering ONU may send own authentication information in the quiet window. The OLT may obtain the authentication information of the Registering ONU in the quiet window and perform ranging on the ONU. The ONU is matched with the OLT to further complete the registration process. Here, the quiet window may be either an unallocated idle bandwidth or an idle bandwidth obtained by the OLT through an overall bandwidth allocation algorithm.

The OLT may register other ONUs which do not complete registration as required.

Case 3: In this optional embodiment, a registration signal sent by the registering ONU collisions with an uplink data frame sent by the working ONU, and causes an error for a delimitation in the uplink data frame sent by the working ONU.

To simplify the description, in this optional embodiment, the ONU authentication information library is stored in the OLT. The OLT initiates a registration process for the ONUs corresponding to the authentication information in the ONU authentication information library one by one, and initiates a registration process for one of the ONUs which does not complete registration each time.

The OLT sends a registration request to the Registering ONU. The registration request contains authentication information of the Registering ONU, for example, a serial number of the Registering ONU or a registration sequence of the ONU user. In addition, the registration request may also contain a delay time required before the Registering ONU sends the registration information. The OLT allocates a partial uplink bandwidth in the noisy window to the working ONU to meet a bandwidth requirement of the working ONU.

After receiving the registration request sent by the OLT, the Registering ONU analyzes the ONU authentication information and the delay time (if the registration request contains the information) therein so as to judge whether the authentication information of the Registering ONU is consistent with the ONU authentication information in the registration request. If so, a registration signal is sent to the OLT in response to the registration request either directly or after waiting for a specified delay time.

The working ONU obtains the allocated bandwidth in the noisy window, and constructs an uplink data frame matched with the size of the allocated bandwidth. The length of a preamble of the uplink data frame is twice that of a preamble of a normal data frame plus the length of a registration signal, and a delimitation of the uplink data frame is lengthening changed from a normal delimitation. The delimitation length is at least one original delimitation length larger than that of the registration signal. FEC check is added to a payload after the uplink data frame is delimited, and FEC block interleaving is performed to form a final uplink data frame, so that the uplink data frame is sent within the allocated bandwidth in the noisy window.

The OLT receives the uplink data frame sent by the working ONU in the noisy window, processes the preamble to obtain a signal amplitude and a recovered signal clock, identifies at least one correct part in the lengthening changed delimitation, judges a position where a collision error occurs between the lengthening changed delimitation and the registration signal according to the correct part, estimates an RTT of the Registering ONU according to the position where the error occurs and a delay time (if any) when the Registering ONU sends the registration information, obtains an uplink data frame payload, reduces an interleaved FEC block in the uplink data frame payload into an independent FEC block, and performs check and error correction on the independent FEC block. The OLT opens an accurate quiet window for the Registering ONU in a subsequent bandwidth allocation process according to the estimated RTT of the Registering ONU. The Registering ONU may send own authentication information in the quiet window. The OLT may obtain the authentication information of the Registering ONU in the quiet window and perform ranging on the ONU, and the ONU is matched with the OLT to further complete the registration process. Here, the quiet window may be either an unallocated idle bandwidth or an idle bandwidth obtained by the OLT through an overall bandwidth allocation algorithm.

The OLT may register other ONUs which do not complete registration as required.

Case 4: In this optional embodiment, a registration signal sent by the registering ONU partially is at an idle bandwidth and partially collisions with an uplink data frame sent by the working ONU, and causes an error for a preamble in the uplink data frame sent by the working ONU.

To simplify the description, in this optional embodiment, the ONU authentication information base is stored in the OLT. The OLT initiates a registration process for the ONUs corresponding to the authentication information in the ONU authentication information library one by one, and initiates a registration process for one of the ONUs which does not complete registration each time.

The OLT sends a registration request to the Registering ONU. The registration request contains authentication information of the Registering ONU, for example, a serial number of the Registering ONU or a registration sequence of the ONU user. In addition, the registration request may also contain a delay time required before the Registering ONU sends the registration information. The OLT allocates a partial uplink bandwidth in the noisy window to the working ONU to meet a bandwidth requirement of the working ONU.

After receiving the registration request sent by the OLT, the Registering ONU analyzes the ONU authentication information and the delay time (if the registration request contains the information) therein so as to judge whether the authentication information of the Registering ONU is consistent with the ONU authentication information in the registration request. If so, a registration signal is sent to the OLT in response to the registration request either directly or after waiting for a specified delay time.

The working ONU obtains the allocated bandwidth in the noisy window, and constructs an uplink data frame matched with the size of the allocated bandwidth. The length of a preamble of the uplink data frame is twice that of a preamble of a normal data frame plus the length of a registration signal, and a delimitation of the uplink data frame is lengthening changed from a normal delimitation. The delimitation length is at least one original delimitation length larger than that of the registration signal. FEC check is added to a payload after the uplink data frame is delimited, and FEC block interleaving is performed to form a final uplink data frame, so that the uplink data frame is sent within the allocated bandwidth in the noisy window.

The OLT receives the uplink data frame sent by the working ONU in the noisy window, and detects registration signals in an idle bandwidth before the uplink data frame. If the registration signals are detected in the preamble of the uplink data frame, a position where the registration signal collisions is estimated according to one or two of the registration signals, and an RTT of the Registering ONU is estimated according to a delay time (if any) when the Registering ONU sends the registration information. The OLT completes signal amplitude detection and signal clock recovery, identifies a repeated delimitation to obtain an uplink data frame payload, reduces an interleaved FEC block in the uplink data frame payload into an independent FEC block, and performs check and error correction on the independent FEC block to obtain correct FEC data. The OLT opens an accurate quiet window for the Registering ONU in a subsequent bandwidth allocation process according to the estimated RTT of the Registering ONU. The Registering ONU may send own authentication information in the quiet window. The OLT may obtain the authentication information of the Registering ONU in the quiet window and perform ranging on the ONU, and the ONU is matched with the OLT to further complete the registration process. Here, the quiet window may be either an unallocated idle bandwidth or an idle bandwidth obtained by the OLT through an overall bandwidth allocation algorithm.

The OLT may register other ONUs which do not complete registration as required.

Case 5: In this optional embodiment, a registration signal sent by the registering ONU collisions with an uplink data frame sent by the working ONU, and causes errors for a preamble and a repeated delimitation in the uplink data frame sent by the working ONU.

To simplify the description, in this optional embodiment, the ONU authentication information base is stored in the OLT. The OLT initiates a registration process for the ONUs corresponding to the authentication information in the ONU authentication information library one by one, and initiates a registration process for one of the ONUs which does not complete registration each time.

The OLT sends a registration request to the Registering ONU. The registration request contains authentication information of the Registering ONU, for example, a serial number of the Registering ONU or a registration sequence of the ONU user. In addition, the registration request may also contain a delay time required before the Registering ONU sends the registration information. The OLT allocates a partial uplink bandwidth in the noisy window to the working ONU to meet a bandwidth requirement of the working ONU.

After receiving the registration request sent by the OLT, the Registering ONU analyzes the ONU authentication information and the delay time (if the registration request contains the information) therein so as to judge whether the authentication information of the Registering ONU is consistent with the ONU authentication information in the registration request. If so, a registration signal is sent to the OLT in response to the registration request either directly or after waiting for a specified delay time.

The working ONU obtains the allocated bandwidth in the noisy window, and constructs an uplink data frame matched with the size of the allocated bandwidth. The length of a preamble of the uplink data frame is twice that of a preamble of a normal data frame plus the length of a registration signal, and a delimitation of the uplink data frame is lengthening changed from a normal delimitation. The delimitation length is at least one original delimitation length larger than that of the registration signal. FEC check is added to a payload after the uplink data frame is delimited, and FEC block interleaving is performed to form a final uplink data frame, so that the uplink data frame is sent within the allocated bandwidth in the noisy window.

The OLT receives the uplink data frame sent by the working ONU in the noisy window, processes the preamble to obtain a signal amplitude and a recovered signal clock, detects a position where the partial preamble is not consistent with a fixed bit sequence, identifies at least one correct part in the lengthening changed delimitation, detects a position where an error occurs in the lengthening changed delimitation, roughly estimates a position where a collision error occurs in the registration signal according to one or two of the positions, estimates an RTT of the Registering ONU according to the position where the error occurs and a delay time (if any) when the Registering ONU sends the registration information, obtains an uplink data frame payload, reduces an interleaved FEC block in the uplink data frame payload into an independent FEC block, and performs check and error correction on the independent FEC block. The OLT opens an accurate quiet window for the Registering ONU in a subsequent bandwidth allocation process according to the estimated RTT of the Registering ONU. The Registering ONU may send own authentication information in the quiet window. The OLT may obtain the authentication information of the Registering ONU in the quiet window and perform ranging on the ONU. The ONU is matched with the OLT to further complete the registration process. Here, the quiet window may be either an unallocated idle bandwidth or an idle bandwidth obtained by the OLT through an overall bandwidth allocation algorithm.

The OLT may register other ONUs which do not complete registration as required.

Case 6: In this optional embodiment, a registration signal sent by the registering ONU collisions with an uplink data frame sent by the working ONU, and causes errors for a repeated delimitation and a payload in the uplink data frame sent by the working ONU.

To simplify the description, in this optional embodiment, the ONU authentication information base is stored in the OLT. The OLT initiates a registration process for the ONUs corresponding to the authentication information in the ONU authentication information library one by one, and initiates a registration process for one of the ONUs which does not complete registration each time.

The OLT sends a registration request to the Registering ONU. The registration request contains authentication information of the Registering ONU, for example, a serial number of the Registering ONU or a registration sequence of the ONU user. In addition, the registration request may also contain a delay time required before the Registering ONU sends the registration information. The OLT allocates a partial uplink bandwidth in the noisy window to the working ONU to meet a bandwidth requirement of the working ONU.

After receiving the registration request sent by the OLT, the Registering ONU analyzes the ONU authentication information and the delay time (if the registration request contains the information) therein so as to judge whether the authentication information of the Registering ONU is consistent with the ONU authentication information in the registration request. If so, a registration signal is sent to the OLT in response to the registration request either directly or after waiting for a specified delay time.

The working ONU obtains the allocated bandwidth in the noisy window, and constructs an uplink data frame matched with the size of the allocated bandwidth. The length of a preamble of the uplink data frame is twice that of a preamble of a normal data frame plus the length of a registration signal, and a delimitation of the uplink data frame is lengthening changed from a normal delimitation. The delimitation length is at least one original delimitation length larger than that of the registration signal. FEC check is added to a payload after the uplink data frame is delimited, and FEC block interleaving is performed to form a final uplink data frame, so that the uplink data frame is sent within the allocated bandwidth in the noisy window.

The OLT receives the uplink data frame sent by the working ONU in the noisy window, processes the preamble to obtain a signal amplitude and a recovered signal clock, identifies at least one correct part in the front of the lengthening changed delimitation and calculates an uplink data frame payload, roughly estimates a position collisioning with the registration information according to a position where an error occurs in the lengthening changed delimitation, obtains the uplink data frame payload, reduces an interleaved FEC block in the uplink data frame payload into an independent FEC block, and performs check and error correction on the independent FEC block to obtain correct FEC data. If errors are detected and positioned in multiple independent FEC blocks, the errors in the multiple independent FEC blocks are correlated, the positions where the errors occur in the uplink data frame sent by the working ONU are positioned, and an RTT of the Registering ONU is estimated according to at least one of a registration signal position obtained by estimating the repeated delimitation and a position where an error occurs in the payload, and a delay time (if any) when the Registering ONU sends the registration information. The OLT opens an accurate quiet window for the Registering ONU in a subsequent bandwidth allocation process according to the estimated RTT of the Registering ONU. The Registering ONU may send own authentication information in the quiet window. The OLT may obtain the authentication information of the Registering ONU in the quiet window and perform ranging on the ONU, and the ONU is matched with the OLT to further complete the registration process. Here, the quiet window may be either an unallocated idle bandwidth or an idle bandwidth obtained by the OLT through an overall bandwidth allocation algorithm.

The OLT may register other ONUs which do not complete registration as required.

Case 7: In this optional embodiment, a registration signal sent by the registering ONU partially collisions with an uplink data frame sent by the working ONU and causes an error for a payload in the uplink data frame sent by the working ONU, and partially is in an idle bandwidth.

To simplify the description, in this optional embodiment, the ONU authentication information library is stored in the OLT. The OLT initiates a registration process for the ONUs corresponding to the authentication information in the ONU authentication information library one by one, and initiates a registration process for one of the ONUs which does not complete registration each time.

The OLT sends a registration request to the Registering ONU. The registration request contains authentication information of the Registering ONU, for example, a serial number of the Registering ONU or a registration sequence of the ONU user. In addition, the registration request may also contain a delay time required before the Registering ONU sends the registration information. The OLT allocates a partial uplink bandwidth in the noisy window to the working ONU to meet a bandwidth requirement of the working ONU.

After receiving the registration request sent by the OLT, the Registering ONU analyzes the ONU authentication information and the delay time (if the registration request contains the information) therein so as to judge whether the authentication information of the Registering ONU is consistent with the ONU authentication information in the registration request. If so, a registration signal is sent to the OLT in response to the registration request either directly or after waiting for a specified delay time.

The working ONU obtains the allocated bandwidth in the noisy window, and constructs an uplink data frame matched with the size of the allocated bandwidth. The length of a preamble of the uplink data frame is twice that of a preamble of a normal data frame plus the length of a registration signal, and a delimitation of the uplink data frame is lengthening changed from a normal delimitation. The delimitation length is at least one original delimitation length larger than that of the registration signal. FEC check is added to a payload after the uplink data frame is delimited, and FEC block interleaving is performed to form a final uplink data frame, so that the uplink data frame is sent within the allocated bandwidth in the noisy window.

The OLT receives the uplink data frame sent by the working ONU in the noisy window, processes the preamble to obtain a signal amplitude and a recovered signal clock, identifies the lengthening changed delimitation to obtain an uplink data frame payload, reduces an interleaved FEC block in the uplink data frame payload into an independent FEC block, and performs check and error correction on the independent FEC block to obtain correct FEC data. If errors are detected and positioned in multiple independent FEC blocks, the errors in the multiple independent FEC blocks are correlated, and the positions where the errors occur in the uplink data frame sent by the working ONU are positioned. Registration information is detected within an idle bandwidth after the uplink data frame. An RTT of the Registering ONU is estimated according to the positions where the errors occur in FEC block interweaving and a delay time (if any) when the Registering ONU sends the registration information. The OLT opens an accurate quiet window for the Registering ONU in a subsequent bandwidth allocation process according to the estimated RTT of the Registering ONU. The Registering ONU may send own authentication information in the quiet window. The OLT may obtain the authentication information of the Registering ONU in the quiet window and perform ranging on the ONU, and the ONU is matched with the OLT to further complete the registration process. Here, the quiet window may be either an unallocated idle bandwidth or an idle bandwidth obtained by the OLT through an overall bandwidth allocation algorithm.

The OLT may register other ONUs which do not complete registration as required.

Further, in another optional embodiment of the present disclosure, in order to simplify the ONU registration mechanism, if an error occurs in an uplink data frame, only error correction is performed, the position of a collision signal is not judged, and the registration signal is detected only within an idle bandwidth. If the registration signal cannot be detected in the idle bandwidth, the bandwidth allocation in the noisy window is adjusted to enable the ONU to perform registration again.

To simplify the description, in this optional embodiment, the ONU authentication information library is stored in the OLT. The OLT initiates a registration process for the ONUs corresponding to the authentication information in the ONU authentication information library one by one, and initiates a registration process for one of the ONUs which does not complete registration each time.

The OLT sends a registration request to the Registering ONU. The registration request contains authentication information of the Registering ONU, for example, a serial number of the Registering ONU or a registration sequence of the ONU user. In addition, the registration request may also contain a delay time required before the Registering ONU sends the registration information. The OLT allocates a partial uplink bandwidth in the noisy window to the working ONU to meet a bandwidth requirement of the working ONU.

After receiving the registration request sent by the OLT, the Registering ONU analyzes the ONU authentication information and the delay time (if the registration request contains the information) therein so as to judge whether the authentication information of the Registering ONU is consistent with the ONU authentication information in the registration request. If so, a registration signal is sent to the OLT in response to the registration request either directly or after waiting for a specified delay time.

The working ONU obtains the allocated bandwidth in the noisy window, and constructs an uplink data frame matched with the size of the allocated bandwidth. The length of a preamble of the uplink data frame is twice that of a preamble of a normal data frame plus the length of a registration signal, and a delimitation of the uplink data frame is lengthening changed from a normal delimitation. The delimitation length is at least one original delimitation length larger than that of the registration signal. FEC check is added to a payload after the uplink data frame is delimited, and FEC block interleaving is performed to form a final uplink data frame, so that the uplink data frame is sent within the allocated bandwidth in the noisy window.

The OLT receives the uplink data frame sent by the working ONU in the noisy window, performs fault tolerance and error correction processing on the lengthened preamble to obtain a signal amplitude and a recovered signal clock, identifies a partial or entire repeated delimitation after performing fault tolerance and error correction processing on the lengthening changed delimitation to obtain an uplink data frame payload, reduces an interleaved FEC block in the uplink data frame payload into an independent FEC block, and performs check and error correction on the independent FEC block to obtain correct FEC data.

The OLT detects a registration signal within the idle bandwidth of the noisy window and estimates the position of the registration signal within the idle bandwidth. For example, the optical module outputs a signal detection prompt within the idle bandwidth of the noisy window. The OLT estimates a logical distance between the Registering ONU and the OLT according to the position of the signal detection prompt and a delay time (if any) when the Registering ONU sends the registration information. The OLT opens an accurate quiet window for the Registering ONU in a subsequent bandwidth allocation process according to the estimated RTT of the Registering ONU. The Registering ONU may send own authentication information in the quiet window. The OLT may obtain the authentication information of the Registering ONU in the quiet window and perform ranging on the ONU, and the ONU is matched with the OLT to further complete the registration process. Here, the quiet window may be either an unallocated idle bandwidth or an idle bandwidth obtained by the OLT through an overall bandwidth allocation algorithm.

The OLT may register other ONUs which do not complete registration as required.

Further, in yet another optional embodiment of the present disclosure, if an error occurs in an uplink data frame, error correction is performed, the position of a collision signal is judged according to the error correction position, and the registration signal is also detected within an idle bandwidth. If the registration signals cannot be detected in the idle bandwidth and the uplink data frame, the bandwidth allocation in the noisy window is adjusted to enable the ONU to perform registration again.

To simplify the description, in this optional embodiment, the ONU authentication information library is stored in the OLT. The OLT initiates a registration process for the ONUs corresponding to the authentication information in the ONU authentication information library one by one, and initiates a registration process for one of the ONUs which does not complete registration each time.

The OLT sends a registration request to the Registering ONU. The registration request contains authentication information of the Registering ONU, for example, a serial number of the Registering ONU or a registration sequence of the ONU user. In addition, the registration request may also contain a delay time required before the Registering ONU sends the registration information. The OLT allocates a partial uplink bandwidth in the noisy window to the working ONU to meet a bandwidth requirement of the working ONU.

After receiving the registration request sent by the OLT, the Registering ONU analyzes the ONU authentication information and the delay time (if the registration request contains the information) therein so as to judge whether the authentication information of the Registering ONU is consistent with the ONU authentication information in the registration request. If so, a registration signal is sent to the OLT in response to the registration request either directly or after waiting for a specified delay time.

The working ONU obtains the allocated bandwidth in the noisy window, and constructs an uplink data frame matched with the allocated bandwidth in size. The length of a preamble of the uplink data frame is twice that of a preamble of a normal data frame plus the length of a registration signal, and a delimitation of the uplink data frame is lengthening changed from a normal delimitation. The delimitation length is at least one original delimitation length larger than that of the registration signal. FEC check is added to a payload after the uplink data frame is delimited, and FEC block interleaving is performed to form a final uplink data frame, so that the uplink data frame is sent within the allocated bandwidth in the noisy window.

The OLT receives the uplink data frame sent by the working ONU in the noisy window, performs fault tolerance and error correction processing on the lengthened preamble to obtain a signal amplitude and a recovered signal clock, obtains a registration signal position if the lengthened preamble is subjected to error correction processing, performs fault tolerance and error correction processing on the lengthening changed delimitation, and then identifies the lengthening changed delimitation. If the registration signal position is obtained after performing error correction processing on the lengthening changed delimitation, an uplink data frame payload is obtained according to the lengthening changed delimitation, an interleaved FEC block in the uplink data frame payload is reduced into an independent FEC block, and check and error correction are performed on the independent FEC block to obtain correct FEC data. If multiple FEC blocks are subjected to error correction processing, a registration signal position is obtained according to the error correction processing. Then, an RTT of the Registering ONU is estimated according to the positions where the errors occur and a delay time (if any) when the Registering ONU sends the registration information by combining the registration signal position obtained by the error correction processing of the lengthened preamble, the error correction processing of the lengthening changed delimitation and the error correction processing of the payload. The OLT opens an accurate quiet window for the Registering ONU in a subsequent bandwidth allocation process according to the estimated RTT of the Registering ONU. The Registering ONU may send own authentication information in the quiet window. The OLT may obtain the authentication information of the Registering ONU in the quiet window and perform ranging on the ONU, and the ONU is matched with the OLT to further complete the registration process. Here, the quiet window may be either an unallocated idle bandwidth or an idle bandwidth obtained by the OLT through an overall bandwidth allocation algorithm.

The OLT detects a registration signal within the idle bandwidth of the noisy window and estimates the position of the registration signal within the idle bandwidth. For example, the optical module outputs a signal detection prompt within the idle bandwidth of the noisy window. The OLT estimates a logical distance between the Registering ONU and the OLT according to the position of the signal detection prompt and a delay time (if any) when the Registering ONU sends the registration information. The OLT opens an accurate quiet window for the Registering ONU in a subsequent bandwidth allocation process according to the estimated RTT of the Registering ONU. The Registering ONU may send own authentication information in the quiet window. The OLT may obtain the authentication information of the Registering ONU in the quiet window and perform ranging on the ONU, and the ONU is matched with the OLT to further complete the registration process. Here, the quiet window may be either an unallocated idle bandwidth or an idle bandwidth obtained by the OLT through an overall bandwidth allocation algorithm.

The OLT may register other ONUs which do not complete registration as required.

In an embodiment, the method may further include the following execution steps.

In step S35, first distance information of the second ONU is acquired.

In an embodiment, after the first distance information of the second ONU is acquired in step S35, the method may further include the following execution steps.

In step S36, a second time window is opened for the second ONU according to the first distance information to complete registration of the second ONU, the second time window being used for acquiring authentication information of the second ONU, and measuring second distance information between an OLT and the second ONU.

The working ONU sends data in the allocated bandwidth obtained in the noisy window, which may be damaged by collision with a registration signal sent by the Registering ONU. Therefore, the working ONU needs redundancy protection for sending data in the noisy window, so that the OLT can recover the data even if the data is damaged by collision.

When the registration signal sent by the Registering ONU conflicts with the uplink data sent by the working ONU, the OLT recovers the collision uplink data sent by the working ONU through redundancy protection measures, positions a collision position and preliminarily obtains an RTT of the ONU. The OLT opens a small quiet window (equivalent to the above second time window) for the Registering ONU according to initial distance information (that is, the above first distance information) determined by the RTT, acquires Registering ONU information and performs accurate ranging so as to acquire accurate distance information (that is, the above second distance information) between the OLT and the second ONU. After receiving an accurate ranging command of the OLT, the Registering ONU sends own authentication information to the OLT.

In addition, when the registration signal sent by the Registering ONU is completely within an unallocated bandwidth in the noisy window, the OLT detects the registration signal and preliminarily obtains an RTT of the ONU. The OLT opens a small quiet window (equivalent to the above second time window) for the Registering ONU according to initial distance information (that is, the above first distance information) determined by the RTT, acquires Registering ONU information and performs accurate ranging so as to acquire accurate distance information (that is, the above second distance information) between the OLT and the second ONU. After receiving an accurate ranging command of the OLT, the Registering ONU sends own authentication information to the OLT.

A registration signal reaching the OLT in an idle bandwidth will be described in further detail below in connection with an optional embodiment.

In this optional embodiment, the registration signal reaches the OLT in the idle bandwidth. The registration signal sent by the Registering ONU reaches the OLT within the idle bandwidth in the noisy window and does not collision with the uplink data frame sent by the working ONU.

To simplify the description, in this optional embodiment, the ONU authentication information library is stored in the OLT. The OLT initiates a registration process for the ONUs corresponding to the authentication information in the ONU authentication information library one by one, and initiates a registration process for one of the ONUs which does not complete registration each time.

The OLT sends a registration request to the Registering ONU. The registration request contains authentication information of the Registering ONU, for example, a serial number of the Registering ONU or a registration sequence of the ONU user. In addition, the registration request may also contain a delay time required before the Registering ONU sends the registration information. The OLT allocates a partial uplink bandwidth in the noisy window to the working ONU to meet a bandwidth requirement of the working ONU.

After receiving the registration request sent by the OLT, the Registering ONU analyzes the ONU authentication information and the delay time (if the registration request contains the information) therein so as to judge whether the authentication information of the Registering ONU is consistent with the ONU authentication information in the registration request. If so, a registration signal is sent to the OLT in response to the registration request either directly or after waiting for a specified delay time.

The working ONU obtains the allocated bandwidth in the noisy window, and constructs an uplink data frame matched with the allocated bandwidth in size. The length of a preamble of the uplink data frame is twice that of a preamble of a normal data frame plus the length of a registration signal, and a delimitation of the uplink data frame is lengthening changed from a normal delimitation. The delimitation length is at least one original delimitation length larger than that of the registration signal. FEC check is added to a payload after the uplink data frame is delimited, and FEC block interleaving is performed to form a final uplink data frame, so that the uplink data frame is sent within the allocated bandwidth in the noisy window.

The OLT detects a registration signal within the idle bandwidth of the noisy window and estimates the position of the registration signal within the idle bandwidth. For example, the optical module outputs a signal detection prompt within the idle bandwidth of the noisy window. The OLT estimates a logical distance between the Registering ONU and the OLT according to the position of the signal detection prompt and a delay time (if any) when the Registering ONU sends the registration information. The OLT opens an accurate quiet window for the Registering ONU in a subsequent bandwidth allocation process according to the estimated RTT of the Registering ONU. The Registering ONU may send own authentication information in the quiet window. The OLT may obtain the authentication information of the Registering ONU in the quiet window and perform ranging on the ONU, and the ONU is matched with the OLT to further complete the registration process. Here, the quiet window may be either an unallocated idle bandwidth or an idle bandwidth obtained by the OLT through an overall bandwidth allocation algorithm.

The OLT may register other ONUs which do not complete registration as required.

In an optional embodiment of the present disclosure, when the OLT does not detect the registration signal sent by the Registering ONU, the OLT may adjust the bandwidth allocated to the working ONU and the unallocated uplink bandwidth in the noisy window so that the Registering ONU sends the registration signal again or the OLT enables the Registering ONU to perform random delay and then sends the registration signal, or the OLT suspends the registration of the ONU and starts the registration of the ONU again after registration of other ONUs, or the OLT starts registration of the ONU again after waiting for a period of time.

The situation that the OLT does not detect a registration signal will be described in further detail below in various cases in combination with an optional embodiment.

Case 1: A Registration Signal Overlaps a Working Data Frame, but does not Affect the Working Data Frame In this optional embodiment, a registration signal sent by the Registering ONU overlaps an uplink data frame sent by the working ONU, but does not affect the uplink data frame sent by the working ONU.

To simplify the description, in the present embodiment, the ONU authentication information library is stored in the OLT. The OLT initiates a registration process for the ONUs corresponding to the authentication information in the ONU authentication information library one by one, and initiates a registration process for one of the ONUs which does not complete registration each time.

The OLT sends a registration request to the Registering ONU. The registration request contains authentication information of the Registering ONU, for example, a serial number of the Registering ONU or a registration sequence of the ONU user. The registration request may also contain a delay time required before the Registering ONU sends the registration information. The OLT allocates a partial uplink bandwidth in the noisy window to the working ONU to meet a bandwidth requirement of the working ONU.

After receiving the registration request sent by the OLT, the Registering ONU analyzes the ONU authentication information and the delay time (if the registration request contains the information) therein so as to judge whether the authentication information of the Registering ONU is consistent with the ONU authentication information in the registration request. If so, a registration signal is sent to the OLT in response to the registration request either directly or after waiting for a specified delay time.

The working ONU obtains the allocated bandwidth in the noisy window, and constructs an uplink data frame matched with the allocated bandwidth in size. The length of a preamble of the uplink data frame is twice that of a preamble of a normal data frame plus the length of a registration signal, and a delimitation of the uplink data frame is lengthening changed from a normal delimitation. The delimitation length is at least one original delimitation length larger than that of the registration signal. FEC check is added to a payload after the uplink data frame is delimited, FEC block interleaving is performed to form a final uplink data frame, and the uplink data frame is sent within the allocated bandwidth in the noisy window finally.

The registration signal sent by the Registering ONU overlaps with the working data frame sent by the working ONU, but does not affect the working data frame. The OLT can correctly parse the working data frame and does not detect errors. The OLT receives the uplink data frame sent by the working ONU in the noisy window, processes the preamble to obtain a signal amplitude and a recovered signal clock, identifies a repeated delimitation to obtain an uplink data frame payload, reduces an interleaved FEC block in the uplink data frame payload into an independent FEC block, and performs check and error correction on the independent FEC block.

When the Registering ONU is much farther from the OLT than the working ONU, the registration signal is much weaker than the working data frame signal, which may occur in the present embodiment, but this does not limit the present embodiment and the present disclosure.

The OLT may try to adjust the idle bandwidth position of the noisy window or modify the delay time and enable the Registering ONU to register again, or the OLT may suspend registration of the ONU and then register the ONU after registration of other ONUs is completed.

Case 2: The ONU does not Respond to Registration

In this embodiment, the Registering ONU does not send a registration signal in response to a registration request of the OLT.

To simplify the description, in the present embodiment, the ONU authentication information library is stored in the OLT. The OLT initiates a registration process for the ONUs corresponding to the authentication information in the ONU authentication information library one by one, and initiates a registration process for one of the ONUs which does not complete registration each time.

The OLT sends a registration request to the Registering ONU. The registration request contains authentication information of the Registering ONU, for example, a serial number of the Registering ONU or a registration sequence of the ONU user. The registration request may also contain a delay time required before the Registering ONU sends the registration information. The OLT allocates a partial uplink bandwidth in the noisy window to the working ONU to meet a bandwidth requirement of the working ONU.

The Registering ONU does not send a registration signal to the OLT, for example, the Registering ONU is not powered on, or the Registering ONU cannot respond to the OLT during startup, or the Registering ONU works in an abnormal state, cannot respond to the OLT, etc.

The working ONU obtains the allocated bandwidth in the noisy window, and constructs an uplink data frame matched with the allocated bandwidth in size. The length of a preamble of the uplink data frame is twice that of a preamble of a normal data frame plus the length of a registration signal, and a delimitation of the uplink data frame is lengthening changed from a normal delimitation. The delimitation length is at least one original delimitation length larger than that of the registration signal. FEC check is added to a payload after the uplink data frame is delimited, FEC block interleaving is performed to form a final uplink data frame, and the uplink data frame is sent within the allocated bandwidth in the noisy window finally.

The OLT can correctly parse the working data frame and does not detect errors, and the OLT does not detect a registration signal within the idle bandwidth in the noisy window. The OLT receives the uplink data frame sent by the working ONU in the noisy window, processes the preamble to obtain a signal amplitude and a recovered signal clock, continues to receive a subsequent data stream, identifies a repeated delimitation to obtain an uplink data frame payload, reduces an interleaved FEC block in the uplink data frame payload into an independent FEC block, and performs check and error correction on the independent FEC block.

The OLT may try to adjust the idle bandwidth position of the noisy window or modify the delay time and enable the Registering ONU to register again, or the OLT may suspend registration of the ONU and then register the ONU after registration of other ONUs is completed.

Figure 6:
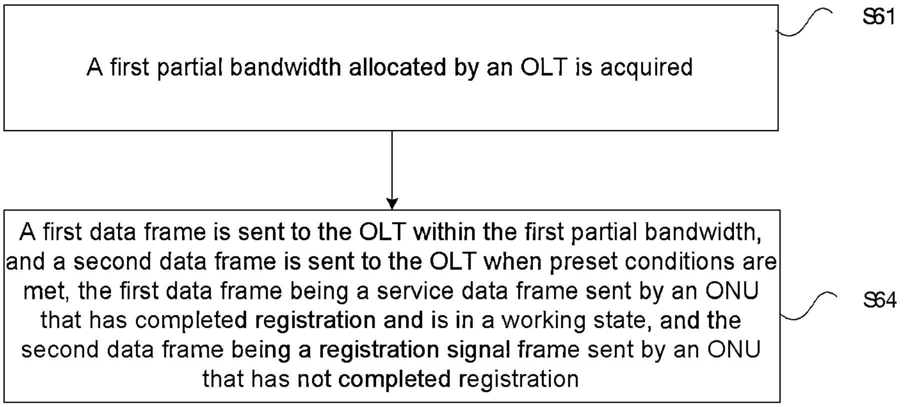
FIG. 6 is a flowchart of another data processing method for a PON system according to an embodiment of the present disclosure.

Another data processing method for a PON system running on a working ONU is also provided in the present embodiment. FIG. 6 is a flowchart of another data processing method for a PON system according to an embodiment of the present disclosure. As shown in FIG. 6, the flow includes the following steps.

In step S61, a first partial bandwidth allocated by an OLT is acquired.

In step S64, a first data frame is sent to the OLT within the first partial bandwidth, and a second data frame is sent to the OLT when preset conditions are met, the first data frame being a service data frame sent by an ONU that has completed registration and is in a working state, and the second data frame being a registration signal frame sent by an ONU that has not completed registration.

In an optional implementation manner, the operation that the second data frame is sent to the OLT when the preset conditions are met may include but is not limited to one of the following modes:

- Mode 1: A second ONU actively sends the second data frame to the OLT.
- Mode 2: The second ONU sends the second data frame after obtaining a registration request message sent by the OLT.
- Mode 3: The second ONU sends the second data frame after obtaining a registration request message and a delay duration sent by the OLT and then waiting for the delay duration.

In the PON system provided by the embodiment of the present disclosure, the working ONU may send a data frame in the process of registering the Registering ONU. The OLT may detect the registration signal sent by the Registering ONU in the idle bandwidth, may detect the registration signal and recover the collision working data when the registration signal and the working data conflict, and may roughly estimate distance information between the Registering ONU and the OLT.

In the PON, when there is an ONU in registration, the working ONU may send data, the bandwidth in the noisy window is fully utilized, the bandwidth utilization rate is improved, the delay caused by the noisy window in the ONU registration process is reduced or even eliminated, and therefore the transmission delay in the PON system is reduced.

In an embodiment, the execution body of the above steps may be, but is not limited to, a working ONU or the like.

In an embodiment, before the first data frame is sent to the OLT within the first partial bandwidth in step S64, the method may further include the following execution steps.

In step S62, a notification from the OLT that redundancy protection measures are taken on the first data frame is acquired.

In step S63, redundancy protection measures are taken on the first data frame.

If needed, when the OLT allocates the bandwidth in the noisy window for the working ONU, the working ONU is notified to perform redundancy protection when sending data. The working ONU receives the bandwidth in the noisy window allocated by the OLT, and the working ONU needs to perform redundancy protection on data when sending the data in the bandwidth.

In an optional implementation manner, in addition to allocating a normal bandwidth to the working ONU, the OLT also allocates an additional bandwidth in the noisy window, so that the working ONU sends data within the normal bandwidth, and repeatedly sends the data sent within the normal bandwidth within the additional bandwidth.

After receiving a normal bandwidth and a redundant bandwidth in the noisy window allocated by the OLT, the working ONU sends data within the normal bandwidth and repeatedly sends the data sent within the normal bandwidth within the redundant bandwidth. The data is sent within the normal bandwidth through the working ONU, and the data sent within the normal bandwidth is repeatedly sent within the additional bandwidth. Therefore, even if one part of the data is damaged by collision, the other part of the data is not damaged by collision, so that the OLT can recover uplink data from the data which is not damaged by collision. This redundancy protection measure may be used when there are more idle bandwidths in the noisy window.

In an embodiment, the operation that redundancy protection measures are taken on the first data frame in step S63 may include the following execution steps.

In step S631, a payload in the first data frame is coded by adopting a preset coding mode, a damage range of the second data frame being within an error correction range of a coding redundancy protection block of the preset coding mode.

The working ONU sends data within the allocated bandwidth obtained in the noisy window, and adopts FEC and other codes to perform redundancy protection. The damage range of the registration signal is within the error correction range of the coding redundancy protection block, the OLT can recover the data damaged by collision and can position a bit where the error occurs. For example, when the FEC employs Reed-Solomon RS (255, 223), the error correction capability of an FEC block is (255−223)/2=16 bytes. Thus, when the registration signal damage capability does not exceed 16 bytes, the ONU may take such redundancy protection measures.

The working ONU sends data within the allocated bandwidth obtained in the noisy window, adopts FEC and other codes to perform redundancy protection, adopts random interleaving of coding blocks, and disperses concentrated errors generated by collision into multiple coding blocks. In the receiving process, the OLT firstly performs de-interleaving of interleaved coding blocks, recovers each coding block, respectively performs check and error correction on each coding block, and then performs interleaving of the coding blocks so as to judge a position where the error occurs. Taking RS (255, 223) as an example, each FEC block is 255 bytes, and the interleaving order of two FEC blocks is as follows: a first bit of the first FEC block, a second bit of the second FEC block, a second bit of the first FEC block, a second bit of the second FEC block, . . . a 255th bit of the first FEC block, and a 255th bit of the second FEC block, and a 510-byte FEC interleaved block is formed. When the damage range of the registration signal to the FEC interleaved block is 16 bytes, the damage is dispersed into two FEC blocks in the FEC interleaved block, and 8 bytes of each FEC block are damaged. Of course, interleaving of more FEC blocks may be achieved, and the interleaving process may be in units of 1 bit or in units of multiple bits. The descriptions are omitted herein.

In an embodiment, the operation that redundancy protection measures are taken on the first data frame in step S63 may include the following execution steps.

In step S632, a preamble in the first data frame is lengthened to obtain a lengthened preamble, the lengthened preamble being used for signal amplitude detection and signal clock recovery when the OLT generates a collision.

The data sent by the working ONU is a burst data frame, and the data frame further follows fields such as a preamble and delimitation. The preamble is mainly used for signal amplitude detection and signal clock recovery at an OLT and is usually obtained by repeating a fixed bit sequence. The delimitation is used for the OLT to identify a starting position of the burst data frame and is usually a fixed bit sequence. If the preamble and the delimitation are damaged, the OLT may not be able to correctly parse an uplink data frame sent by the working ONU, and therefore redundancy protection is also needed for the preamble and the delimitation, including preamble lengthening, delimitation lengthening and changing, etc. As an optional implementation manner, the preamble is lengthened to twice the original preamble plus the length of a registration signal, the registration signal occurring at any position of the lengthened preamble. The OLT can finish signal amplitude detection and signal clock recovery in the lengthened preamble, and the OLT can roughly judge the collision position of the register signal by combining information such as a time point when an uplink data frame signal is detected, a time point when the signal clock recovery is completed, and information that the position of the delimitation is obtained. As an optional implementation manner, the OLT performs multiple signal amplitude detections at the front of the lengthened preamble and selects a signal amplitude with a higher confidence level for subsequent signals. As an optional implementation manner, the OLT locks the signal amplitude for a longer period of time after the lengthened preamble completes the signal amplitude detection.

In an embodiment, the operation that redundancy protection measures are taken on the first data frame in step S63 may include the following execution steps.

In step S633, the delimitation in the first data frame is lengthening changed to obtain a lengthened delimitation, the lengthening changed delimitation being used for identifying at least one part of the delimitation when the OLT generates a collision, and the delimitation being used for identifying a starting position of the first data frame by the OLT.

The working ONU may repeatedly change the original delimitation for many times until it is larger than the registration signal by at least one original delimitation length, no matter where the collision between the registration signal and the repeated delimitation occurs, the OLT can find at least one correct part, so that a collision position of the registration signal can be roughly judged according to the found at least one correct part.

Through the description of the above implementation manners, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure.

Embodiment Two

In the present embodiment, a data processing apparatus for a PON system is also provided. The apparatus is used to implement the above embodiments and preferred implementation manners, and those have not been described will not be elaborated. As used below, the term "module" may implement a combination of software and/or hardware of a predetermined function. Although the apparatus described in the following embodiments is preferably implemented in software, hardware, or a combination of software and hardware, is also possible and contemplated.

Figure 7:
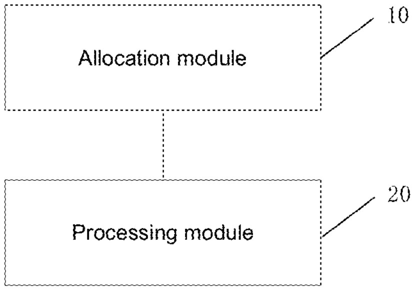
FIG. 7 is a structural block diagram of a data processing apparatus for a PON system according to an embodiment of the present disclosure.

FIG. 7 is a structural block diagram of a data processing apparatus for a PON system according to an embodiment of the present disclosure. As shown in FIG. 7, the apparatus includes: an allocation module 10, configured to allocate a first partial bandwidth to a first ONU within a first time window, the first ONU having completed registration and being in a working state; and a processing module, configured to receive a first data frame from the first ONU within a time corresponding to the first partial bandwidth, and detect a second data frame from a second ONU within the first time window, the second ONU having not completed registration.

In an embodiment, the processing module 20 is configured to detect the second data frame from the second ONU within a second partial bandwidth except the first partial bandwidth within the first time window.

In an embodiment, the processing module 20 is configured to obtain the first data frame by utilizing redundancy protection measures taken by the first ONU on the first data frame.

In an embodiment, the processing module 20 is further configured to obtain, when the redundancy protection measures taken by the first ONU on the first data frame are utilized to identify that the first data frame is in error, a collision position of the second data frame and the first data frame.

Figure 8:
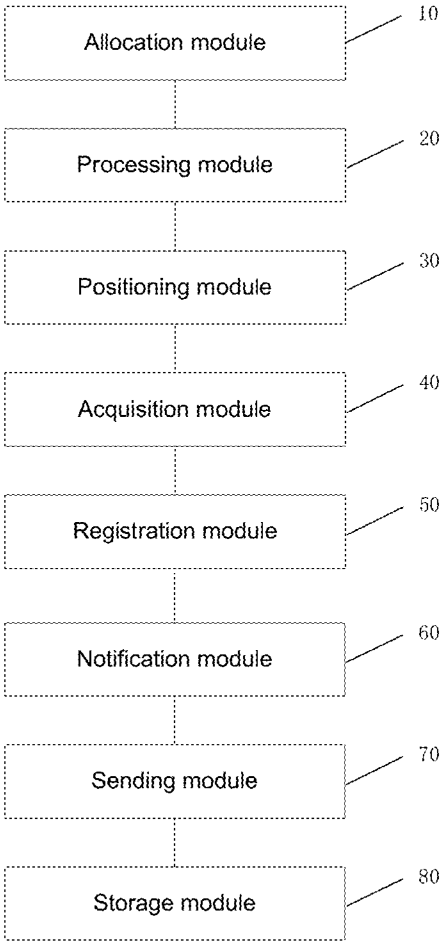
FIG. 8 is a structural block diagram of a data processing apparatus for a PON system according to an embodiment of the present disclosure.

In an embodiment, FIG. 8 is a structural block diagram of a data processing apparatus for a PON system according to an embodiment of the present disclosure. As shown in FIG. 8, in addition to all the modules shown in FIG. 7, the apparatus further includes: a positioning module 30, configured to allocate the first partial bandwidth within the subsequent first time window, the collision position being not contained in the time corresponding to the first partial bandwidth; and detect the second data frame from the second ONU within the first time window, and position the collision position again.

In an embodiment, FIG. 8 is a structural block diagram of a data processing apparatus for a PON system according to an embodiment of the present disclosure. As shown in FIG. 8, in addition to all the modules shown in FIG. 7, the apparatus further includes: an acquisition module 40, configured to acquire first distance information of the second ONU.

In an embodiment, FIG. 8 is a structural block diagram of a data processing apparatus for a PON system according to an embodiment of the present disclosure. As shown in FIG. 8, in addition to all the modules shown in FIG. 7, the apparatus further includes: a registration module 50, configured to open a second time window for the second ONU according to the first distance information to complete registration of the second ONU, the second time window being used for acquiring authentication information of the second ONU, and measuring second distance information between an OLT and the second ONU.

In an embodiment, FIG. 8 is a structural block diagram of a data processing apparatus for a PON system according to an embodiment of the present disclosure. As shown in FIG. 8, in addition to all the modules shown in FIG. 7, the apparatus further includes: a notification module 60, configured to notify the first ONU to take redundancy protection measures on the first data frame.

In an embodiment, the processing module 20 is further configured to recover, when detecting that the first data frame is in error through a preset coding mode adopted by the first ONU for a payload of the first data frame, the first data frame and position the collision position, a damage range of a collision between the second data frame and the first data frame being within an error correction range of a coding redundancy protection block of the preset coding mode.

In an embodiment, the processing module 20 is further configured to recover, when detecting the abnormality of a signal amplitude and/or a signal clock by performing signal amplitude detection and signal clock recovery on a preamble lengthened by the first ONU, the signal amplitude and/or the signal clock, and position the collision position.

In an embodiment, the processing module 20 is further configured to correctly identify, when an error is detected from a delimitation lengthening changed by the first ONU, at least one part of the delimitation, obtain a position where the delimitation is in error, position the collision position, and obtain a starting position of a payload.

In an embodiment, FIG. 8 is a structural block diagram of a data processing apparatus for a PON system according to an embodiment of the present disclosure. As shown in FIG. 8, in addition to all the modules shown in FIG. 7, the apparatus further includes: a sending module 70, configured to send a registration request message to the second ONU, the registration request message being used for notifying the second ONU to send the second data frame, and the registration request message at least carrying first authentication information.

In an embodiment, FIG. 8 is a structural block diagram of a data processing apparatus for a PON system according to an embodiment of the present disclosure. As shown in FIG. 8, in addition to all the modules shown in FIG. 7, the apparatus further includes: a storage module 80, configured to store authentication information of the first ONU and the second ONU so as to initiate a registration process to the second ONU according to the authentication information, the authentication information including: identity information of each ONU and/or identity information of an ONU user.

In an embodiment, the registration request message further carries a delay duration for instructing the second ONU to send the second data frame after waiting for the delay duration.

Figure 9:
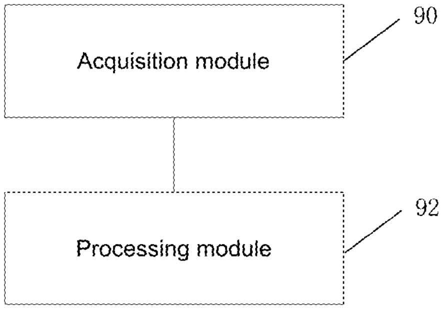
FIG. 9 is a structural block diagram of another data processing apparatus for a PON system according to an embodiment of the present disclosure.

FIG. 9 is a structural block diagram of another data processing apparatus for a PON system according to an embodiment of the present disclosure. As shown in FIG. 9, the apparatus includes: an acquisition module 90, configured to acquire a first partial bandwidth allocated by an OLT; and a processing module 92, configured to send a first data frame to the OLT within the first partial bandwidth, and send a second data frame to the OLT when preset conditions are met, the first data frame being a service data frame sent by an ONU that has completed registration and is in a working state, and the second data frame being a registration signal frame sent by an ONU that has not completed registration.

Figure 10:
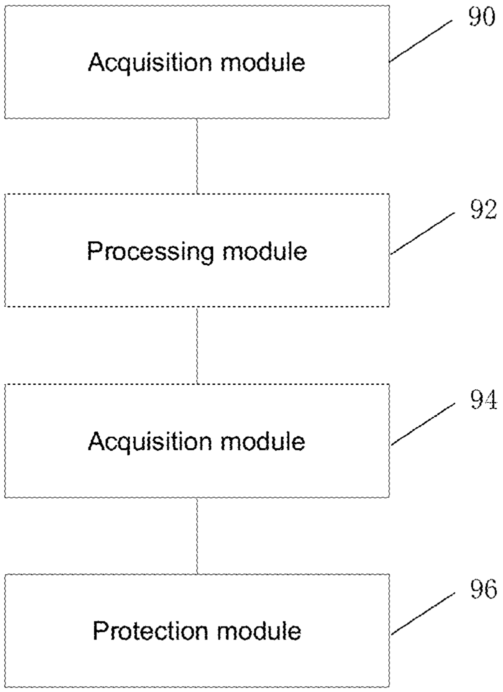
FIG. 10 is a structural block diagram of another data processing apparatus for a PON system according to an embodiment of the present disclosure.

In an embodiment, FIG. 10 is a structural block diagram of another data processing apparatus for a PON system according to an embodiment of the present disclosure. As shown in FIG. 10, in addition to all the modules shown in FIG. 9, the apparatus further includes: an acquisition module 94, configured to acquire a notification from the OLT that redundancy protection measures are taken on the first data frame; and a protection module 96, configured to take redundancy protection measures on the first data frame.

In an embodiment, the protection module 96 is configured to code a payload in the first data frame by adopting a preset coding mode, a damage range of the second data frame being within an error correction range of a coding redundancy protection block of the preset coding mode.

In an embodiment, the protection module 96 is configured to lengthen a preamble in the first data frame to obtain a lengthened preamble, the lengthened preamble being used for signal amplitude detection and signal clock recovery when the OLT generates a collision.

In an embodiment, the protection module 96 is configured to lengthen and change a delimitation in the first data frame to obtain a lengthened delimitation, the lengthening changed delimitation being used for identifying at least one part of the delimitation when the OLT generates a collision, and the delimitation being used for identifying a starting position of the first data frame by the OLT.

In an embodiment, sending, by the processing module 92, the second data frame to the OLT when the preset conditions are met includes one of the following: actively sending the second data frame to the OLT; sending the second data frame after obtaining a registration request message sent by the OLT; and sending the second data frame after obtaining a registration request message and a delay duration sent by the OLT and then waiting for the delay duration.

It is to be noted that each of the above modules may be implemented by software or hardware. For the latter, it may be implemented by, but not limited to, the following manners that the above modules are all located in the same processor; or, the above modules are located in different processors in any combination form respectively.

Embodiment Three

The embodiment of the present disclosure also provides a storage medium. The storage medium stores a computer program that is configured to, when run, perform the steps in any one of the above method embodiments.

In an embodiment, in the present embodiment, the storage medium may be configured to store a computer program for performing the following steps.

In step S1, a first partial bandwidth is allocated to a first ONU within a first time window, the first ONU having completed registration and being in a working state.

In step S2, a first data frame from the first ONU is received within a time corresponding to the first partial bandwidth, and a second data frame from a second ONU is detected within the first time window, the second ONU having not completed registration.

In an embodiment, in the present embodiment, the storage medium may be further configured to store a computer program for performing the following steps.

In step S1, a first partial bandwidth allocated by an OLT is acquired.

In step S2, a first data frame is sent to the OLT within the first partial bandwidth, and a second data frame is sent to the OLT when preset conditions are met, the first data frame being a service data frame sent by an ONU that has completed registration and is in a working state, and the second data frame being a registration signal frame sent by an ONU that has not completed registration.

In an embodiment, in the present embodiment, the storage medium may include, but is not limited to, various media capable of storing a computer program such as a U disk, a ROM, a RAM, a mobile hard disk, a magnetic disk or an optical disc.

Embodiment Four

The embodiment of the present disclosure also provides an electronic device. The electronic device includes a memory and a processor. The memory stores a computer program. The processor is configured to run the computer program to perform the steps in any one of the above method embodiments.

In an embodiment, the electronic device may further include a transmission device and an input-output device. The transmission device is connected to the processor, and the input-output device is connected to the processor.

In an embodiment, in the present embodiment, the processor may be configured to use the computer program to perform the following steps.

In step S1, a first partial bandwidth is allocated to a first ONU within a first time window, the first ONU having completed registration and being in a working state.

In step S2, a first data frame from the first ONU is received within a time corresponding to the first partial bandwidth, and a second data frame from a second ONU is detected within the first time window, the second ONU having not completed registration.

In an embodiment, in the present embodiment, the processor may be further configured to use the computer program to perform the following steps.

In step S1, a first partial bandwidth allocated by an OLT is acquired.

In step S2, a first data frame is sent to the OLT within the first partial bandwidth, and a second data frame is sent to the OLT when preset conditions are met, the first data frame being a service data frame sent by an ONU that has completed registration and is in a working state, and the second data frame being a registration signal frame sent by an ONU that has not completed registration.

In an embodiment, a specific example in the present embodiment may refer to the examples described in the above embodiments and optional implementation manners, and details are not described herein in the present embodiment.

It is apparent that a person skilled in the art shall understand that all of the above-mentioned modules or steps in the present disclosure may be implemented by using a general calculation device, may be centralized on a single calculation device or may be distributed on a network composed of multiple calculation devices. In an embodiment, they may be implemented by using executable program codes of the calculation devices. Thus, they may be stored in a storage device and executed by the calculation devices, the shown or described steps may be executed in a sequence different from this sequence under certain conditions, or they are manufactured into each integrated circuit module respectively, or multiple modules or steps therein are manufactured into a single integrated circuit module. Thus, the present disclosure is not limited to the combination of any specific hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

What claimed is:

1. A method for sending a short registration signal, comprising:

sending, a short registration signal to an Optical Line Terminal (OLT), in order to enable the OLT to detect a collision position between the short registration signal and working data frames.

2. The method according to claim 1, wherein sending, the short registration signal to the OLT, in order to enable the OLT to detect the position of the short registration signal within the idle bandwidth, or, in order to enable the OLT to detect the collision position between the short registration signal and working data frames, comprises:

sending, a short registration signal to the OLT, in order to enable the OLT to determine the conflict location based on error correction information, and recover a portion of the work data frame affected by the short registration signal according to the conflict location.

3. A Computer-readable storage medium, storing a computer program which, when being run, performs the method according to claim 2.

4. An electronic device, comprising a memory and a processor, wherein the memory stores a computer program, and the processor is configured to run the computer program to perform the method according to claim 2.

5. The method according to claim 1, wherein before sending, a short registration signal to an Optical Line Terminal (OLT), further comprises:

receiving, a registration request message of Optical Network Unit (ONU), sent by the OLT.

6. The method according to claim 5, wherein the method further comprises:

after receiving the registration request message of the ONU sent by the OLT, acquiring a delay duration and authentication information of the ONU both carried in the registration request message;

in a case that it is determined that authentication information of ONU is consistent with the authentication information carried in the registration request, sending a registration signal to the OLT in response to the registration request message either directly or after waiting for a specified delay time.

7. A Computer-readable storage medium, storing a computer program which, when being run, performs the method according to claim 6.

8. An electronic device, comprising a memory and a processor, wherein the memory stores a computer program, and the processor is configured to run the computer program to perform the method according to claim 6.

9. A Computer-readable storage medium, storing a computer program which, when being run, performs the method according to claim 5.

10. An electronic device, comprising a memory and a processor, wherein the memory stores a computer program, and the processor is configured to run the computer program to perform the method according to claim 5.

11. The method according to claim 1, wherein sending, the short registration signal to the OLT, comprises:

sending, the short registration signal to the OLT, in order to enable OLT to estimate a logical distance between an ONU and the OLT.

12. A Computer-readable storage medium, storing a computer program which, when being run, performs the method according to claim 11.

13. An electronic device, comprising a memory and a processor, wherein the memory stores a computer program, and the processor is configured to run the computer program to perform the method according to claim 11.

14. The method according to claim 1, wherein before sending, a short registration signal to an Optical Line Terminal (OLT), in order to enable the OLT to detect a position of the short registration signal within the idle bandwidth, or, in order to enable the OLT to detect a collision position between the short registration signal and working data frames, the method further comprises:

In a case that the OLT is not required to correctly parse the short registration signal, determining that the short brief registration signal does not contain a preamble and delimitation.

15. A Computer-readable storage medium, storing a computer program which, when being run, performs the method according to claim 14.

16. A Computer-readable storage medium, storing a computer program which, when being run, performs the method according to claim 1.

17. An electronic device, comprising a memory and a processor, wherein the memory stores a computer program, and the processor is configured to run the computer program to perform the method according to claim 1.

18. An apparatus for sending a short registration signal, applied to an Optical Network Unit (ONU) and comprising:

a sending module, configured to send a short registration signal to an Optical Line Terminal (OLT), in order to enable the OLT to detect a collision position between the short registration signal and working data frames.

* * * * *